United States Patent [19]

Thompson

[11] 4,340,235
[45] Jul. 20, 1982

[54] LOAD RESPONSIVE DAMPING SYSTEM

[75] Inventor: Norman D. Thompson, Dallas, Oreg.

[73] Assignee: Towmotor Corporation, Mentor, Ohio

[21] Appl. No.: 91,675

[22] PCT Filed: Oct. 4, 1979

[86] PCT No.: PCT/US79/00820
§ 371 Date: Oct. 4, 1979
§ 102(e) Date: Oct. 4, 1979

[51] Int. Cl.³ .............................................. B66F 9/22
[52] U.S. Cl. .................................. 280/6 H; 180/290; 414/634
[58] Field of Search ............... 180/290; 280/6 R, 6 H, 280/6.1, 6.11; 414/630, 631, 632, 634

[56] References Cited

U.S. PATENT DOCUMENTS

| | | | |
|---|---|---|---|
| 2,704,132 | 3/1955 | Marco | 180/290 |
| 2,835,507 | 5/1958 | Davies | 280/112 |
| 3,045,853 | 7/1962 | Card, Sr. | 414/634 |
| 3,480,100 | 11/1969 | Gaulke | 280/6 R X |
| 3,494,494 | 2/1970 | Lindgren | 414/634 |
| 3,528,677 | 9/1970 | Evans et al. | 280/6 R |
| 3,560,016 | 2/1971 | Bundorf | 280/96.2 |
| 3,690,688 | 9/1972 | Fleury | 280/6 H |
| 3,702,196 | 11/1972 | Krutis | 280/111 |
| 3,850,323 | 11/1974 | Ekstrom | 414/634 |
| 3,884,496 | 5/1975 | Ito et al. | 280/6 H X |
| 3,970,327 | 7/1976 | Dezelan | 280/6 H X |
| 4,076,195 | 2/1978 | Uhler | 248/9 |
| 4,093,091 | 6/1978 | Gregg et al. | 414/634 |
| 4,093,092 | 6/1978 | Habiger et al. | 414/634 |
| 4,093,259 | 6/1978 | Stedman | 280/755 |

FOREIGN PATENT DOCUMENTS

| | | | |
|---|---|---|---|
| 1939719 | 2/1971 | Fed. Rep. of Germany | 280/6 R |
| 1470499 | 4/1977 | United Kingdom | 414/673 |

Primary Examiner—Richard A. Bertsch
Assistant Examiner—Michael Mar
Attorney, Agent, or Firm—Phillips, Moore, Weissenberger, Lempio & Majestic

[57] ABSTRACT

A damping system (43) for use in a lift truck (10) to damp oscillating motions of the vehicle frame (14). The system includes a pair of hydraulic tilt cylinders (46a, 46b) which sense moments of force of a carried load (12). A pair of second hydraulic cylinders (72a, 72b) are in communication to a rear axle (28) of the vehicle. The rear axle is resiliently mounted from a second end portion (18) of the vehicle frame (14), and is moved by the second cylinders in directions substantially normal to the vehicle frame. Such movement is responsive to sensed moments of force of the lifted load.

12 Claims, 4 Drawing Figures

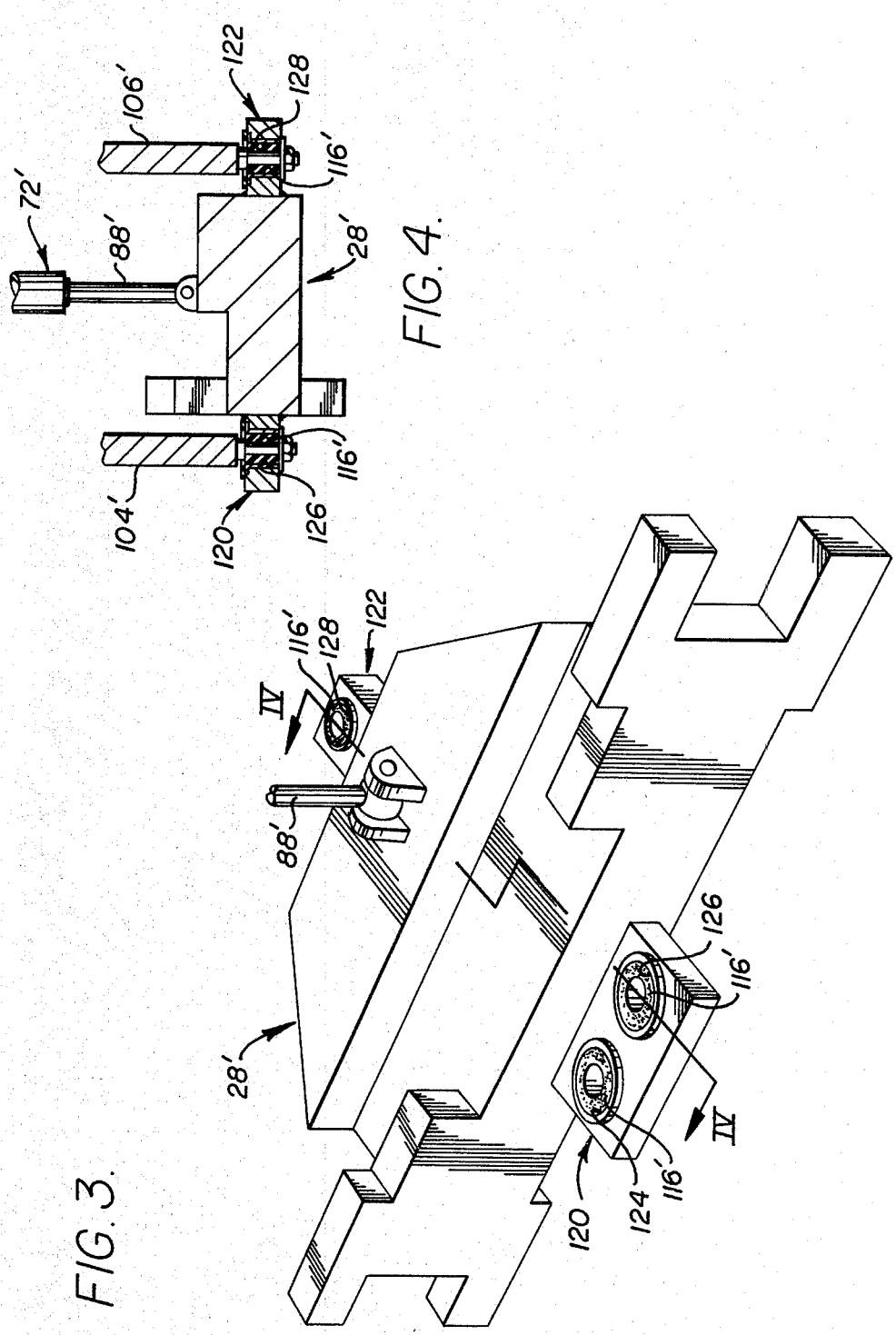

LOAD RESPONSIVE DAMPING SYSTEM

DESCRIPTION

1. Technical Field

This invention relates to a damping system for a vehicle, particularly a load carrying vehicle such as a lift truck.

2. Background Art

When load lifting vehicles, such as lift trucks, traverse uneven terrain, the operators thereof are subjected to oscillating motions of the vehicle frame. Such motions are also encountered during brake application, and load drop or catch. These oscillations are made more acute by changes in moments of force of a load lifted thereupon. As a consequence, an operator is subjected to a hard, loping ride which tends to be quite uncomfortable, and may hinder maneuverability.

3. Disclosure of the Invention

The present invention is directed to overcoming one or more of the problems as set forth above.

In one aspect of the present invention, a damping system comprising a sensing means and a damping means is provided. The damping system is useful in a vehicle of the load carrying type including a frame and a load carrying device connected to the frame. The load carrying and frame connection define a load pivot axis. When a load is carried on the load carrying device, and a variable load is imposed on the load carrying device, the sensing means senses the variable load and the damping means moves the axle responsive to the sensed variable load.

Accordingly, the damping system acts to damp oscillating motions of a vehicle incorporating the inventive improvement, and provides a smoother, more comfortable ride for an operator thereof, and also provides for ease of maneuverability.

BRIEF DESCRIPTION OF THE DRAWINGS

Other objects of this invention will become apparent from the following description and accompanying drawings wherein:

FIG. 3 is an enlarged, isometric view which illustrates details of another vehicle damping system embodiment; and, FIG. 4 is a cross-sectional view taken along line IV—IV of FIG. 3.

BEST MODE FOR CARRYING OUT THE INVENTION GENERAL DESCRIPTION

Figure 1:
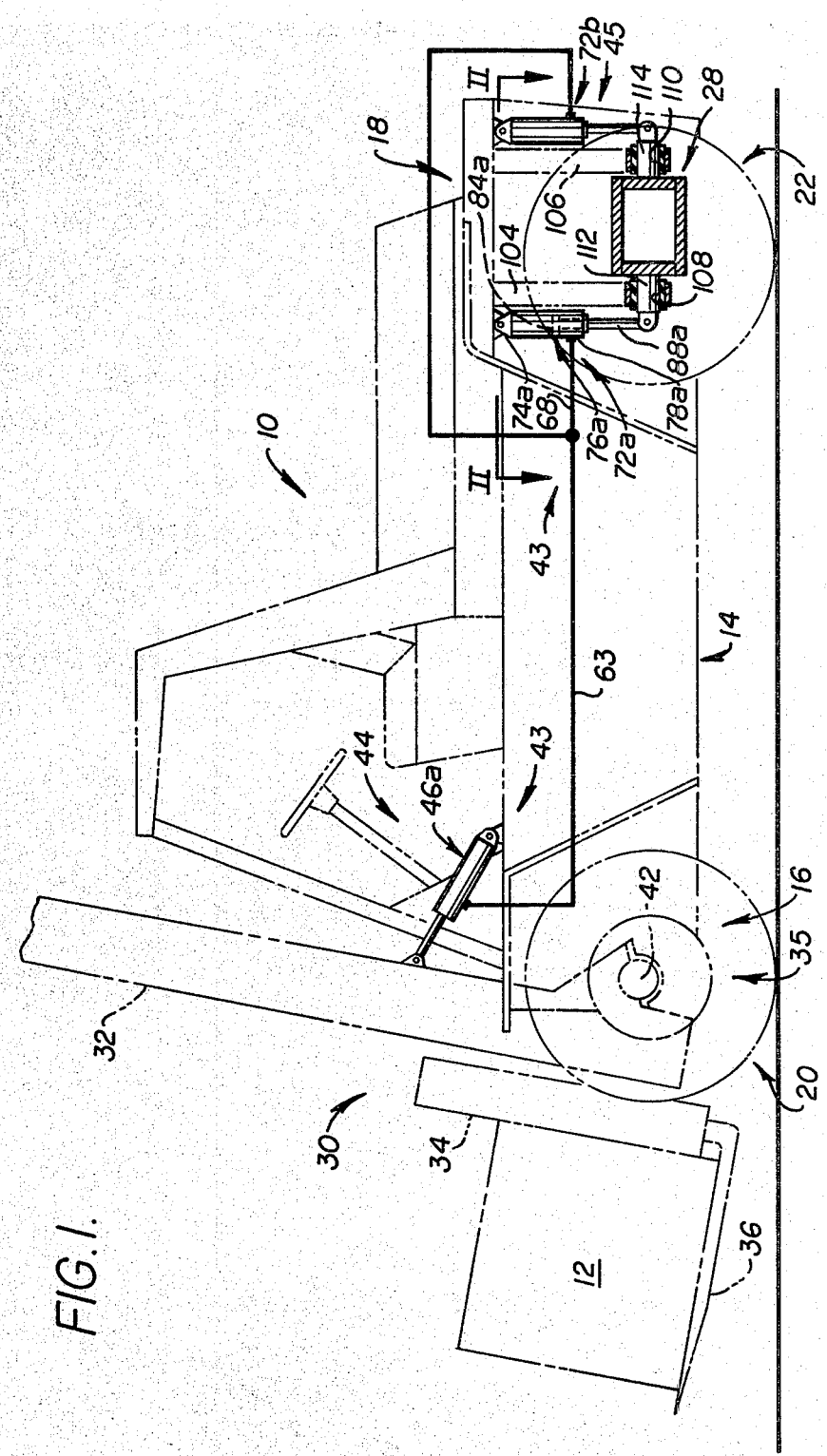
FIG. 1 is a side elevational phantom view of a vehicle for carrying a load which has a vehicle damping system embodiment of the present invention, illustrated partially in cross-section, included therewith.

FIG. 1 illustrates a vehicle 10, herein illustrated as a lift truck, for lifting and carrying a load 12. The vehicle 10 has a horizontally disposed frame 14 with a frame first end portion 16 and a frame second end portion 18. The vehicle 10 includes a pair of first ground engaging members or wheels 20 and a pair of second ground engaging members or wheels 22, such as rim-mounted standard tires.

Wheels 20 may be mounted on a conventional drive axle (not shown) whereas wheels 22 are mounted on an axle 28 (illustrated in FIGS. 1 and 2), or an axle 28' (illustrated in FIGS. 3 and 4). The axles 28 and 28' are massive, with substantial weights, and are mounted on the frame second end portion 18. The mountings for axles 28 and 28' and the differences therebetween are further discussed hereinafter.

Returning to FIG. 1, a standard load lifting and carrying device 30 for load 12 may comprise a mast member 32, a carriage 34 slidably mounted thereupon, and a fork member 36 connected to carriage 34 for supporting the load 12 when lifted by device 30. The load carrying device 30 is normally pivotally connected to the frame first end portion 16 by various conventional means, such as a pillow block 35 on the frame first end portion 16, to permit the mast member 32 to tilt. This connection between the carrying device 30 and the frame first end portion 16 defines a substantially horizontal pivot axis 42.

DESCRIPTION OF FIGS. 1 AND 2 EMBODIMENT

In a vehicle, such as vehicle 10 above described, a damping system embodiment 43 includes sensing means 44 for sensing a moment of force about the pivot axis 42 of a load 12 lifted on the load lifting device 30, and a damping means 45 for responsively moving the axle 28 in directions substantially normal to the frame second end portion 18 in response to moments of force sensed by the sensing means 44 and communicated thereby. The moving means 45 will be more fully discussed hereinafter.

Figure 2:
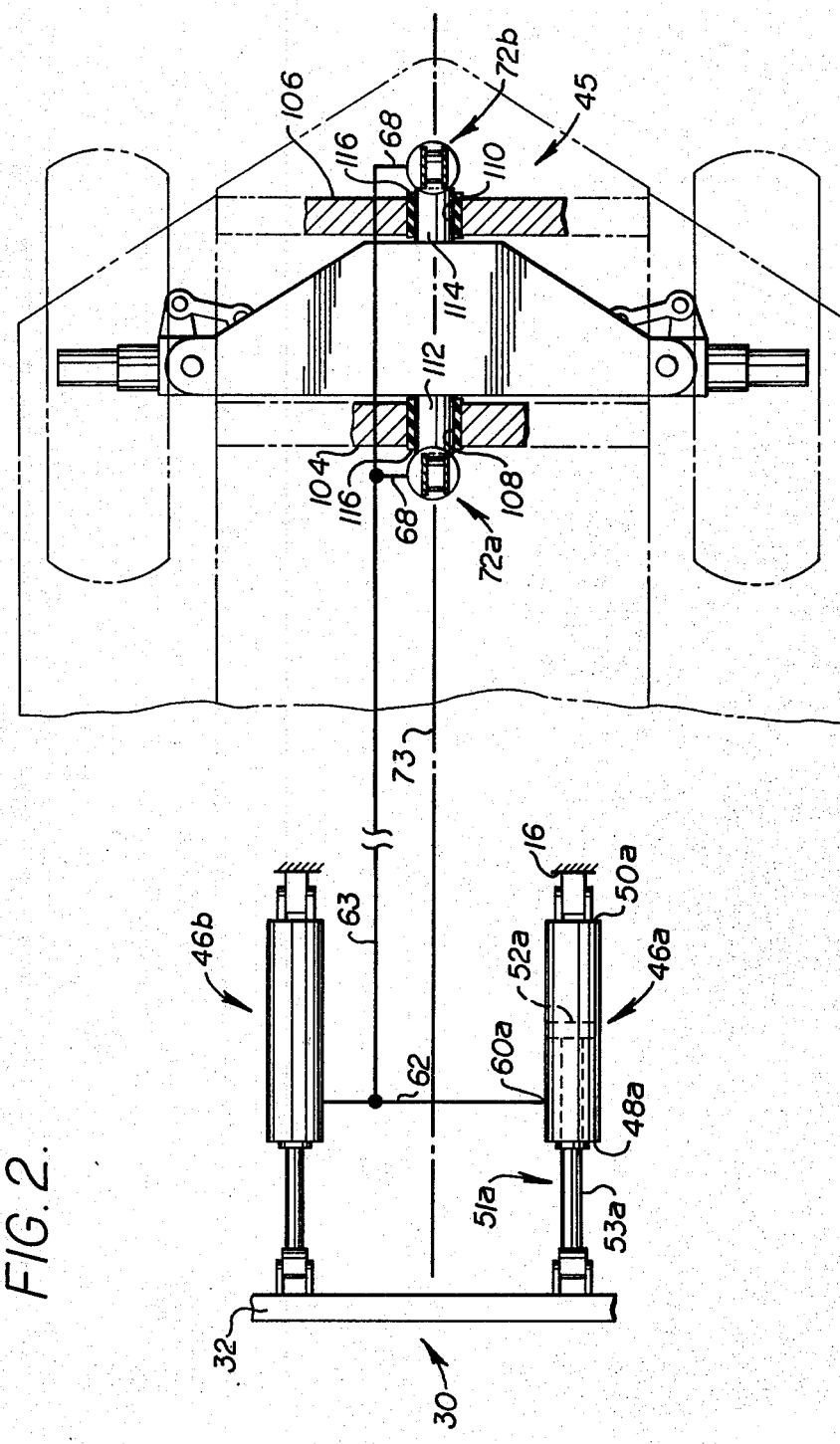
FIG. 2 is an enlarged plan diagrammatic view, with a portion taken along the direction of arrows II—II of FIG. 1 partially sectioned.

Sensing means 44 may conveniently be a pair of double-acting hydraulic tilt cylinders 46a and 46b as shown in FIG. 2. Each tilt cylinder 46a, 46b is substantially the same as the other, and the description will thus describe tilt cylinder 46a as representative of both unless otherwise noted.

Referring to FIG. 2, hydraulic tilt cylinder 46a has a rod end 48a, a head end 50a, and a piston assembly 51a. Piston assembly 51a has a piston head 52a and a piston rod 53a extending therefrom. The piston head 52a is slidable within the tilt cylinder 46a and isolates the rod end 48a from the head end 50a. The tilt cylinder 46a is connected to the load carrying device 30, more specifically to the mast member 32, by the piston rod 53a and is connected to the frame first end portion 16 at the head end 50a. Inside each of the rod and head ends 48a, 50a is contained a full quantity of pressurized hydraulic fluid. This fluid has a steady-state (carry) pressure when both ends of the cylinder are blocked at the control valve (not shown) which is determined by a hydraulic system of vehicle 10 (the hydraulic system being conventional and not herein illustrated or further discussed).

A moment of force of load 12 about pivot axis 42, with a direction inward with respect to tilt cylinder 46a, will be sensed by the rod end 48a as a decrease in the pressure of the fluid therein; whereas a moment force of load 12 about pivot axis 42 outward with respect to tilt cylinder 46a will be sensed by the rod end 48a as an increase in the pressure of the fluid therein. As may be appreciated, since a fixed quantity of hydraulic fluid fills both the rod end 48a and the head end 50a, the piston 51a will not substantially move.

The tilt cylinder 46a has an outlet 60a in the rod end 48a thereof which is in communication with a conduit 62. Conduit 62 cross-communicates between each tilt cylinder 46a, 46b and thence to a conduit 63. Conduit 63 is adapted to carry pressurized hydraulic fluid therethrough, and extends toward the frame second end portion 18. Alternatively, conduit 62 could be interconnected between the head ends 50a, 50b of cylinders 46a, 46b. Tilt cylinders 46a, 46b and connecting conduits 62, 63 are completely filled with fluid.

The conduit 63 communicates hydraulic fluid to the damping means 45. Damping means 45 is for responsively moving the axle 28 in directions substantially normal to the frame second end portion 18 which leads to damping the oscillations of frame 14.

Referring to FIG. 2, the damping means 45 of the damping system embodiment 43 includes a pair of double-acting hydraulic cylinders 72a and 72b preferably disposed in tandem relationship along the longitudinal axis 73 of the vehicle. Each hydraulic cylinder 72a and 72b is substantially the same as the other, and thus the cylinder 72a will be hereinafter discussed as representative of both unless otherwise noted.

Turning to FIG. 1, the hydraulic cylinder 72a is pivotally connected at a cylinder first end 74a to the frame second end portion 18. The cylinder 72a has a piston assembly 76a slidably received within a rod end 78a of the cylinder 72a. The rod end 78a is in communication with a second end portion 68 of the conduit 63. The piston assembly 76a has a piston head 84a and a piston rod 88a slidably disposed in cylinder 72a. The rod 88a extends from rod end 78a of cylinder 72a and is pivotally connected to axle 28.

Referring to FIG. 2, the axle 28 is mounted from the frame second end portion 18 by a pair of frame members 104, 106 which extend vertically downwardly and substantially transverse to the second end portion 18. The frame members 104, 106 each include a respective longitudinally extending bore 108, 110. Axle 28 has a pair of opposed trunnions 112, 114 extending longitudinally outwardly therefrom and which extend through bores 108, 110. Interposed between the trunnion 112 and the frame member 104 (and between the trunnion 112 and frame member 106) is an annular bushing 116 which includes an elastomeric member made of rubber, or various synthetic rubber-like materials which have resilient properties. The means for mounting axle 28 on frame second end portion 18 described above is hereinafter referred to as a trunnion mounting means.

In the above described embodiment, each hydraulic cylinder 72a and 72b is connected to a respective trunnion 112, 114 with the connections being spaced longitudinally outwardly of the mounting for axle 28 on frame second end portion 18.

DESCRIPTION OF FIGS. 3 AND 4 EMBODIMENT

FIGS. 3 and 4 illustrate a damping system embodiment 43' which is similar to the damping system embodiment 43, wherein identical structures are indicated by identical reference numerals, and wherein variations are indicated by the addition to the reference numerals of a prime symbol. The chief differences between the damping system embodiments 43 and 43' stem from the different mounting of axle 28' for embodiment 43'. A damping means 45' of damping system embodiment 43' has one hydraulic cylinder 72' rather than the pair of hydraulic cylinders 72a, 72b. The hydraulic cylinder 72' is centrally located and pivotally connected directly to the axle 28'. This connection is by a rod 88'. Hydraulic cylinder 72' is otherwise constructed substantially the same as hydraulic cylinders 72a and 72b. Embodiment 43' includes the modified axle 28' which is mounted as follows.

Axle 28' has a pair of flanges 120, 122 extending longitudinally outwardly therefrom. The flange 120 has a pair of bores 124, 126 vertically extending therethrough, and the flange 122 has a bore 128 vertically extending therethrough. Fitted within each of the bores 124, 126, 128 is bushing 116' which includes an elastomeric member made of rubber or various synthetic rubber-like materials with resilient properties. As illustrated in FIG. 4, a pair of downwardly extending frame members 104', 106' are adapted to pass through bores 124, 126, 128. The mounting of axle 28a from the frame second end portion herein described is hereinafter referred to as a shear mounting means. The elastomeric member included by bushing 116' flexes, or deflects, upon movement of axle 28'.

Thus, both the trunnion mounting means of the embodiment 43 and the shear mounting means of embodiment 43' permit a small amount of resilient vertical movement of the respective axles 28 and 28', the movement being with respect to the frame second end portion 18. Such small amount of resilient movement is utilized by the damping means 45 and 45' to oppose the variable load 12 imposed on the load carrying device 30.

INDUSTRIAL APPLICABILITY

The damping system embodiments 43 and 43' find particular application in use with lift trucks. It should be made obvious to those skilled in the art relating hereto that the damping system 43 or 43' will find other applications, such as the use in construction vehicles, e.g., loaders, wherein a varied load is applied to one end of the vehicle.

Referring to FIG. 1, when the frame front end portion 16 of lift truck 10 rises or lowers due to the vehicle traversing uneven terrain, a moment of force will tend to be created upon load 12, and hence tend to rotate mast element 32 forwardly or backwardly about axis 42. This leads to a pressure increase or decrease responsive thereto in the rod ends of tilt cylinders 46a and 46b. This pressure variation is communicated through the conduit 63 into the rod ends 78 of cylinders 72a and 72b. The pressure variation causes the damping means 45 to rapidly move, or accelerate, the axle 28 in directions substantially normal to the frame second end portion 18. The small amount of movement is, for example, on the order of up to about 0.5". The small amount of movement is to be substantially similar to the amount of deflection in wheels 20.

As previously mentioned, the axle 28 is of substantial weight with respect to a load 12. For example, the axle 28 may weigh about 3,000–4,000 pounds (1,500–2,000 kg) where the vehicle is designed for a load capacity of about 10,000 to about 20,000 pounds (5,000–10,000 kg). As a result of such rapid, though small, movement of the heavy axle 28, the frame second end portion 18 is urged to oppose the movement of load force as it acts upon the frame first end portion 16. Thus the amplitude of the frame oscillations are reduced, or damped because accelerating axle 28 adds a component of force to the frame second end portion 18. As may be understood, the damping system embodiment 43' functions in an analogous manner. Accordingly, the operator of the vehicle has a much more comfortable ride thereon.

Other aspects, objects and advantages of this invention can be obtained from a study of the drawings, the disclosure, and the appended claims.

I claim:

1. In a vehicle (10) of the load carrying type including a horizontally disposed frame (14) having first (16) and second (18) end portions, an axle (28 or 28') mounted to said frame second end portion (18), and a load carrying device (30) being connected to said frame first end portion (16), an improvement comprising:
sensing means (44) for sensing a variable load (12) imposed on said load carrying device (30) and communicating a variable signal in response to said variable load; and,
damping means (45 or 45') for receiving said variable signal communicated by said sensing means (44) and responsively moving said axle (28, 28') and said frame second end portion (18) in directions vertically and relative to each other in response to said variable signal.

2. The improvement as in claim 1 wherein said vehicle (10) is a lift truck having said load carrying device (30) being pivotally connected (35) to said frame first end portion (16) and defining a load pivot axis (42).

3. The improvement as in claim 1 wherein said sensing means (44) includes at least one fluid cylinder (46a) adapted to contain pressurized fluid and said variable signal is pressure variations in pressurized fluid.

4. The improvement as in claim 3 wherein said fluid cylinder (46a) is a tilt cylinder connected between said load carrying device (30) and said frame first end portion (16).

5. The improvement as in claim 3 wherein: said sensing means further includes conduit means (63) for communicating pressurized fluid between said fluid cylinder (46a) and said damping means (45 or 45').

6. The improvement as in claim 1 wherein said axle (28 or 28') is mounted to said frame second end portion (18) by at least one frame member (104 or 104') and by an elastomeric bushing (116 or 116') adapted for connecting said frame member (104 or 104') to said axle (28 or 28') and for permitting limited relative vertical movement therebetween.

7. The improvement as in claim 6 further including at least one trunnion (112) secured to said axle (28), said frame member (104) being connected to said trunnion (112) and said elastomeric bushing (116) being interposed between said frame member (104) and said trunnion (112).

8. The improvement as in claim 7 wherein said damping means (45) includes a fluid cylinder (72a) interconnected between said frame second end portion (18) and said trunnion (112) and further connected to said sensing means (44).

9. The improvement as in claim 1 wherein said axle (28), includes a pair of trunnions (112, 114) secured to said axle (28) said trunnions (112, 114) being connected to said frame second end portion (18) by a pair of frame members (104, 106) and by elastomeric bushings (116) adapted for connecting each of said frame members (104, 106) to a respective one of said trunnions (112, 114) and for permitting limited relative vertical movement therebetween, and said damping means (45) includes a pair of fluid cylinders (72a, 72b) each interconnected between said frame second end portion (18) and a respective each of said trunnions (112, 114).

10. The improvement as in claim 9 wherein said fluid cylinders (72a, 72b) are disposed on a longitudinal axis (73) of said vehicle (10).

11. In a vehicle (10) of the load carrying type including a horizontally disposed frame (14) having first (16) and second (18) end portions, an axle (28 or 28') resiliently mounted to said frame second end portion (18), and a load carrying device (30) being connected to said frame first end portion (16), an improvement comprising:
sensing means (44) for sensing a variable load (12) imposed on said load carrying device (30) and communicating a variable signal in response to said variable load; and,
damping means (45 or 45') for receiving said variable signal communicated by said sensing means (44) and responsively moving said axle (28, 28') and said frame second end portion (18) in directions vertically and relative to each other in response to said variable signal.

12. The improvement as in claim 1 wherein said axle (28') includes a plurality of flanges (120, 122) extending longitudinally outwardly therefrom and being connected to said frame second end portion (18) by a plurality of vertically disposed frame members (104', 106') and by elastomeric bushings (116') adapted for connecting said frame members (104', 106') to each of said flanges (120, 122) and for permitting limited relative vertical movement therebetween, and said damping means (45') includes a fluid cylinder (72') interconnected between said frame second end portion (18) and said axle (28'), said fluid cylinder (72') being centrally located and pivotally connected to said axle (28').

* * * * *